United States Patent
Tanaka et al.

(10) Patent No.: US 9,751,990 B2
(45) Date of Patent: Sep. 5, 2017

(54) TRANSPARENT THERMOPLASTIC RESIN PELLET MANUFACTURING METHOD

(71) Applicant: IDEMITSU KOSAN CO., LTD., Chiyoda-ku (JP)

(72) Inventors: Takayoshi Tanaka, Ichihara (JP); Munehiro Chosa, Ichihara (JP); Yasunobu Yamazaki, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 331 days.

(21) Appl. No.: 14/371,102

(22) PCT Filed: Dec. 21, 2012

(86) PCT No.: PCT/JP2012/083355
§ 371 (c)(1),
(2) Date: Jul. 8, 2014

(87) PCT Pub. No.: WO2013/105422
PCT Pub. Date: Jul. 18, 2013

(65) Prior Publication Data
US 2015/0018511 A1    Jan. 15, 2015

(30) Foreign Application Priority Data
Jan. 10, 2012  (JP) ................................ 2012-002510

(51) Int. Cl.
| | | |
|---|---|---|
| *B29B 7/42* | (2006.01) | |
| *B29B 9/06* | (2006.01) | |
| *C08J 3/00* | (2006.01) | |
| *B29B 9/12* | (2006.01) | |
| *B29B 9/16* | (2006.01) | |
| *B29B 7/48* | (2006.01) | |
| *B29C 47/60* | (2006.01) | |
| *B29C 47/92* | (2006.01) | |
| *B01F 7/00* | (2006.01) | |
| *B29B 7/00* | (2006.01) | |
| *B29B 7/80* | (2006.01) | |
| *B29K 69/00* | (2006.01) | |

(52) U.S. Cl.
CPC .......... *C08J 3/005* (2013.01); *B01F 7/00416* (2013.01); *B29B 7/002* (2013.01); *B29B 7/48* (2013.01); *B29B 7/489* (2013.01); *B29B 7/80* (2013.01); *B29B 9/06* (2013.01); *B29B 9/12* (2013.01); *B29B 9/16* (2013.01); *B29C 47/6087* (2013.01); *B29C 47/92* (2013.01); *B01F 2215/0049* (2013.01); *B29K 2069/00* (2013.01); *B29K 2995/0026* (2013.01); *C08J 2369/00* (2013.01)

(58) Field of Classification Search
None
See application file for complete search history.

(56) References Cited

U.S. PATENT DOCUMENTS

| | | | | |
|---|---|---|---|---|
| 5,717,055 A | * | 2/1998 | Hosomi | ................. C08G 64/40 528/196 |
| 2005/0046070 A1 | * | 3/2005 | Dong | ..................... C08G 65/46 264/141 |
| 2007/0219303 A1 | | 9/2007 | Mortazavi et al. | |
| 2010/0036087 A1 | | 2/2010 | Takahashi et al. | |
| 2010/0244303 A1 | * | 9/2010 | Uchimura | ................. B29B 9/06 264/148 |

FOREIGN PATENT DOCUMENTS

| | | |
|---|---|---|
| CN | 101400491 A | 4/2009 |
| EP | 1 864 775 A1 | 12/2007 |
| JP | 62-79222 | 4/1987 |
| JP | 05-239334 | 9/1993 |
| JP | 6-339920 | 12/1994 |
| JP | 07-021007 | 3/1995 |
| JP | 09-254151 | 9/1997 |
| JP | 2000-351115 | 12/2000 |
| JP | 2003-285317 A | 10/2003 |
| JP | 2005-035134 | 2/2005 |
| JP | 2005-053979 | 3/2005 |
| JP | 2005-349726 | 12/2005 |
| JP | 2011-161860 | 8/2011 |

(Continued)

OTHER PUBLICATIONS

Rauwendaal et al., "Backmixing in Screw Extruders", The Madison Group—http://www.madisongroup.com/publications/backmixing.pdf, Waybackmachine Date Apr. 2010 version, 6 pages.*
Extended Search Report issued Aug. 12, 2015 in European Patent Application No. 12864787.2.
International Search Report Issued Feb. 19, 2013 in PCT/JP12/083355 filed Dec. 21, 2012.
Combined Chinese Office Action and Search Report issued Dec. 24, 2015 in Patent Application No. 201280066422.8 (with English language translation of categories of cited documents).
Xiaozheng Geng, "Twin-Screw Extruder and Application Thereof" China Light Industry Press, 2003, p. 12 and cover sheets.

(Continued)

*Primary Examiner* — Lisa Herring
(74) *Attorney, Agent, or Firm* — Oblon, McClelland, Maier & Neustadt, L.L.P.

(57) ABSTRACT

A method for producing a transparent thermoplastic resin pellet comprising a step of kneading a transparent thermoplastic resin with a kneader under a condition under which a damage history calculated according to the following formula is 500 to 2,500:

Damage history=$\{$Residence time $(tr)\} \times \{$Shear rate $(\gamma)\}$

Residence time $(tr)=(W \times H \times L)/Q$

Shear rate $(\gamma)=(\pi \times D \times N)/H$ in the formulae, W represents a screw groove width (pitch) [cm]; H represents a screw groove depth [cm]; L represents a screw length [cm]; Q represents a resin supply amount [g/s]; D represents a screw diameter [cm]; and N represents a screw rotation number [rps].

8 Claims, No Drawings

(56) References Cited

FOREIGN PATENT DOCUMENTS

KR   10-2009-0093793   9/2009
WO   2008/090673   7/2008

OTHER PUBLICATIONS

Ying Guo, "Screw Extruder" China Textile & Apparel Press, 1990, pp. 53-54 and cover sheets.

* cited by examiner

TRANSPARENT THERMOPLASTIC RESIN PELLET MANUFACTURING METHOD

TECHNICAL FIELD

The present invention relates to a method for manufacturing a transparent thermoplastic resin pellet, and in particular, the present invention relates to a method for manufacturing a pellet of a transparent thermoplastic resin such as a polycarbonate resin, etc.

BACKGROUND ART

In recent years, transparent thermoplastic resins such as polyarylate resins, polymethyl methacrylate resins, polystyrene resins and polycarbonate resins are preferably used as a molding material in the optical field. In these applications, the size or amount of foreign matter (e.g., dusts, carbides, gelled products, etc.) in the resin, and whether the hue of the resin is good or bad largely influences the quality of the product. In particular, in the manufacture of an optical light guide plate, a change of hue of the resin constituting a substrate and a foreign matter in a substrate give an extremely large influence against the reliability of the product.

In a method of obtaining a molded substrate of a relatively small and medium sized mobile phone or the like by means of injection molding, or a method of manufacturing a sheet molded substrate or film molded substrate by melt extruding a transparent thermoplastic resin and extrusion molding the extruded molten material, it is considered that it is very difficult to reduce gels resulting from the resin.

In particular, in the case where it is intended to manufacture a sheet molded substrate or film molded substrate by using a thermoplastic resin which is liable to generate a gel, a manufacture condition becomes severe for the purpose of decreasing the amount of gels generated in the sheet molded substrate or film molded substrate.

In other words, if a transparent thermoplastic resin pellet which hardly generates gels is used as a raw material for manufacturing a sheet molded substrate or film molded substrate, only a processing condition concentrated on the quality (e.g., uniform wall thickness properties, surface smoothness, etc.) of the sheet substrate or film substrate is enough, and a stable sheet substrate or film substrate is obtained.

In addition, a transparent thermoplastic resin which is used in the optical field is required to be less yellowish.

For that reason, a transparent thermoplastic resin pellet capable of manufacturing a highly transparent sheet molded substrate or film molded substrate with small generation amount of gels is required.

Patent Document 1 discloses a method of obtaining a thermoplastic resin in which the amount of foreign matter is reduced by centrifuging a thermoplastic resin solution and water to separate a resin solution phase and recovering it. In addition, Patent Document 2 discloses a method of reducing the amount of foreign matter by filtering a polycarbonate resin in molten state with a polymer filter. In addition, Patent Document 3 discloses a method of manufacturing a polycarbonate resin pellet with a small amount of foreign matter by cooling a melt-extruded polycarbonate resin by using cooling water having a low electric conductivity and a small amount of foreign matter.

Meanwhile, in order that a melt extruder which is used for the manufacture of a thermoplastic resin pellet may adapt to resins of the same kind but having a different melt viscosity from each other, or thermoplastic resins of a different kind from each other, by one machine, there is often taken a method of dividing a screw of a single-screw or twin-screw melt extruder to several to several tens elements and combining such elements so as to make it possible to change the screw shape in conformity with properties of the respective resins. However, when a screw made of a combination of elements is used, large sized colored materials and foreign matter such as gelled products are often generated.

In contrast, Patent Document 4 discloses a method of producing a transparent thermoplastic resin pellet having an extremely small amount of foreign matter by controlling the surface roughness of a joint part end face of screw elements and the maximum height to fixed ranges or less.

However, according to this technique, if a material having low corrosion resistance is used for the screw, there is a concern that crevice corrosion of the screw is generated due to a stress to generate contamination with foreign matter, resulting in a hindrance to reduction of foreign matter. In addition, a screw noise is generated due to torque variations or screw vibration at the time of resin extrusion depending on the constitution, resulting in not only a hindrance to stable production but metal fatigue or deterioration of the screw.

As a method of dissolving the problems in Patent Document 4, thereby making it possible to prevent contamination with foreign matter from occurring, Patent Document 5 discloses a method of melt extruding a transparent thermoplastic resin by using a melt extruder satisfying with requirements such as the number of elements in the screw, roughness of the element joining part, material quality and screw pitch, and subjecting the extruded molten product to extrusion molding to manufacture a sheet.

CITATION LIST

Patent Documents

[Patent Document 1] JP 07-021007 B
[Patent Document 2] JP 05-239334 A
[Patent Document 3] JP 09-254151 A
[Patent Document 4] JP 2000-351115 A
[Patent Document 5] JP 2011-161860 A

SUMMARY OF INVENTION

Technical Problem

However, all of the methods disclosed in Patent Documents 1 to 5 are concerned with reduction of the amount of foreign matter in the resin pellet by preventing incorporation of the foreign matter being caused due to external factors in a purification process, a granulation process, or the like from occurring, but it is impossible to decrease the amount of gels generated in the sheet molded substrate or film molded substrate.

An object of the present invention is to provide a method for manufacturing a transparent thermoplastic resin pellet which when molded into a sheet molded substrate or film molded substrate, is not only small in the amount of gels generated but less yellowish.

Solution to Problem

The present inventors made extensive and intensive investigations, and as a result, it has been found that by controlling an extrusion condition on the occasion of kneading and granulation by using a kneader, a transparent thermoplastic resin pellet which when molded into a sheet molded substrate or film formed substrate, is not only small in the amount of gels generated but less yellowish, can be manufactured. The present invention has been completed on the basis of such findings.

Specifically, the present invention provides the following method for manufacturing a transparent thermoplastic resin pellet and a transparent thermoplastic resin pellet obtained by the method, as well as a method for reducing gels in a transparent thermoplastic resin pellet.

1. A method for producing a transparent thermoplastic resin pellet comprising a step of kneading a transparent thermoplastic resin with a kneader under a condition under which a damage history calculated according to the following formula is 500 to 2,500:

Damage history={Residence time $(tr)$}×{Shear rate $(\gamma)$}

Residence time $(tr)=(W \times H \times L)/Q$

Shear rate $(\gamma)=(\pi \times D \times N)/H$ in the formulae, W represents a screw groove width (pitch) [cm]; H represents a screw groove depth [cm]; L represents a screw length [cm]; Q represents a resin supply amount [g/s]; D represents a screw diameter [cm]; and N represents a screw rotation number [rps].

2. The method for manufacturing a transparent thermoplastic resin pellet as set forth in the item 1, wherein the transparent thermoplastic resin is an aromatic polycarbonate.

3. The method for producing a transparent thermoplastic resin pellet as set forth in the item 2, wherein the aromatic polycarbonate has a viscosity average molecular weight (Mv) of 11,000 to 23,000.

4. The method for producing a transparent thermoplastic resin pellet as set forth in any one of the items 1 to 3, wherein the kneader is a twin-screw kneader.

5. The method for producing a transparent thermoplastic resin pellet as set forth in any one of the items 1 to 4, wherein the kneader is equipped with a melt filter for removal of extraneous foreign matter.

6. A transparent thermoplastic resin pellet produced by the method as set forth in any one of the items 1 to 5.

7. A method for reducing gels in a transparent thermoplastic resin pellet comprising a step of kneading a transparent thermoplastic resin with a kneader under a condition under which a damage history calculated according to the following formula is 500 to 2,500:

Damage history={Residence time $(tr)$}×{Shear rate $(\gamma)$}

Residence time $(tr)=(W \times H \times L)/Q$

Shear rate $(\gamma)=(\pi \times D \times N)/H$ in the formulae, W represents a screw groove width (pitch) [cm]; H represents a screw groove depth [cm]; L represents a screw length [cm]; Q represents a resin supply amount [g/s]; D represents a screw diameter [cm]; and N represents a screw rotation number [rps].

Advantageous Effects of Invention

According to the present invention, it is possible to produce a transparent thermoplastic resin pellet which when molded into a sheet molded substrate or film molded substrate, is not only small in the amount of gels generated but less yellowish. In addition, the transparent thermoplastic resin pellet obtained by the method of the present invention not only contain few gels but also is less yellowish.

DESCRIPTION OF EMBODIMENTS

The conventional method of producing a transparent thermoplastic resin pellet with a small amount of foreign matter is concerned with reduction of the amount of foreign matter in the resin pellet by preventing incorporation of foreign matter to be caused due to external factors in a purification process, a granulation process, or the like from occurring, but it may be impossible to achieve reduction of gels resulting from the resin.

In contrast, according to the method of the present invention, a transparent thermoplastic resin pellet which not only contain few gels but also is less yellowish is produced by controlling an extrusion condition on the occasion of kneading and granulation by using a kneader.

Here, when the transparent thermoplastic resin pellet contain few gels, it is possible to decrease the amount of gels generated in a sheet molded substrate or film molded substrate produced by using this pellet. In consequence, in order to decrease the amount of gels generated in the sheet molded substrate or film molded substrate, a transparent thermoplastic resin pellet with few gels may be used.

In the present invention, by defining an influence which the resin receives within the kneader as a damage history and kneading the resin under a condition under which the damage history is 500 to 2,500, it is possible to produce a transparent thermoplastic resin pellet which not only contain few gels but also is less yellowish.

The method for producing a transparent thermoplastic resin pellet according to the present invention comprises a step of kneading a transparent thermoplastic resin with a kneader under a condition under which a damage history calculated according to the following formula is 500 to 2,500:

Damage history={Residence time $(tr)$}×{Shear rate $(\gamma)$}

Residence time $(tr)=(W \times H \times L)/Q$

Shear rate $(\gamma)=(\pi \times D \times N)/H$ in the formulae, W represents a screw groove width (pitch) [cm]; H represents a screw groove depth [cm]; L represents a screw length [cm]; Q represents a resin supply amount [g/s]; D represents a screw diameter [cm]; and N represents a screw rotation number [rps].

The shape of the screw, namely a screw groove width (pitch) W, a screw groove depth H, a screw length L, and a screw diameter D are properly determined in conformity with the size of a kneader to be used, and numerical value ranges thereof are not particularly limited.

In addition, the resin supply amount Q is also properly determined in conformity with the size of a kneader to be used, and a numerical value range thereof is not particularly limited. The screw rotation number N is properly determined in conformity with the size of a kneader to be used such that the damage history falls within the desired range.

The damage history defined according to the above formula is preferably 700 to 2,300, and more preferably 900 to 2,000 from the viewpoints of kneading of the resin and generation of gels. It should be noted that when the damage history is too small, a load applies excessively to the kneader, so the damage history is 500 or more.

When the above calculation formulae of the residence time and shear rate are used for the calculation formula of the damage history, the damage history can also be expressed according to the following formula:

$$\text{Damage history} = [(W \times H \times L)/Q] \times [(\pi \times D \times N)/H]$$

$$= (W \times L \times \pi \times D) \times (N/Q)$$

in the formula, W, H, L, Q, D, and N are the same as described above.

The kneader used for the method of the present invention is preferably a twin-screw kneader.

In addition, from the viewpoint of preventing incorporation of foreign matter into the resin from occurring, it is preferable that the kneader is equipped with a melt filter for removal of extraneous foreign matter, and it is preferable that the filter is placed between the kneader and a die which is attached to the kneader.

Examples of the transparent thermoplastic resin which is used for the method of the present invention include a polyarylate resin, a polymethyl methacrylate resin, a polystyrene resin and a polycarbonate resin. Among them, a polycarbonate resin is preferable, and an aromatic polycarbonate is more preferable.

The aromatic polycarbonate is preferably a bisphenol A polycarbonate resin whose raw material is bisphenol A. A viscosity average molecular weight (Mv) of the aromatic polycarbonate is preferably 5,000 to 100,000, more preferably 9,000 to 50,000, and still more preferably 11,000 to 23,000 from the viewpoint of fluidity at the time of pellet production, or the like. This viscosity average molecular weight (Mv) is one obtained by measuring a viscosity of a methylene chloride solution at 20° C. with an Ubbelohde viscometer and determining a limiting viscosity [η] from this, followed by calculation according to the following formula.

$$[\eta] = 1.23 \times 10^{-5} \, Mv^{0.83}$$

In addition, the polycarbonate resin may contain a copolymer, and examples thereof include a phenol-modified diol copolymerized polycarbonate and the like. The above-described copolymer can be obtained by, for example, copolymerizing a dihydric phenol typified by bisphenol A and a phenol-modified diol by the interfacial polymerization method by reference to JP 62-79222 A.

The transparent thermoplastic resin may be blended with various additives within the range where the effects of the present invention are not impaired. The additives are not particularly limited, and any additives such as an antioxidant, an ultraviolet absorber, a light stabilizer, a lubricant, a flame retardant, a flame-retardant auxiliary, a mold release agent, an antistatic agent and a coloring agent can be used.

The gels in the transparent thermoplastic resin pellet can be reduced by a method comprising a step of kneading the transparent thermoplastic resin with a kneader under a condition under which the damage history is 500 to 2,500.

EXAMPLES

The present invention is described below more specifically by way of Examples, but it should be construed that the present invention is by no means limited to these Examples.

[YI (Yellow Index) of Injection Molded Article]

A PC pellet was subjected to injection molding with an injection molding machine under a condition at a molding temperature of 280° C. and a die temperature of 90° C. for a cycle time of 40 seconds, thereby making a plate of 50×90×3 mm. The YI of the obtained plate was measured with a spectrophotometer (a trade name: "U-4100", manufactured by Hitachi High-Technologies Corporation) in conformity with JIS K7105.

[Number of Gels]

A PC pellet was molded with a 50 mm sheet molding machine to make a sheet having a thickness of 0.5 mm, and the obtained sheet was cut into an A4 size, thereby preparing a sheet for measurement. Lines were drawn on the sheet for measurement so as to provide grids of 10 mm in square, and the number of gels in the respective places was counted through visual inspection, thereby measuring the number of gels per sheet for measurement. With respect to minute sized gels which are hardly distinguishable from floating foreign matter through visual inspection, the measurement was conducted with a polarizing microscope (magnification: 20 times).

The measurement was conducted with respect to 10 sheets for measurement. In addition, in order to avoid a mistake by floating matters, the measurement was conducted within a clean room with class 10,000.

The polycarbonate resins used in the Examples and Comparative Examples are shown below.

PC-1:
Bisphenol A polycarbonate resin [a trade name: "TARFLON A1700", manufactured by Idemitsu Kosan Co., Ltd., viscosity average molecular weight (Mv)=17,000 in a pellet form]

PC-2:
Bisphenol A polycarbonate resin [a trade name: "TARFLON FN1500", manufactured by Idemitsu Kosan Co., Ltd., viscosity average molecular weight (Mv)=15,000 in a powdered form]

PC-3:
Bisphenol A polycarbonate resin [a trade name: "TARFLON FN1300", manufactured by Idemitsu Kosan Co., Ltd., viscosity average molecular weight (Mv)=11,500 in a powdered form]

PC-4:
Bisphenol A polycarbonate resin [a trade name: "TARFLON FN2200", manufactured by Idemitsu Kosan Co., Ltd., viscosity average molecular weight (Mv)=22,500 in a powdered form]

The twin-screw kneaders used in the Examples and Comparative Examples are shown in Table 1. In addition, with respect to the screw, the disposition of screw elements were adjusted, and Type A with weak kneading strength and Type B with strong kneading strength were used.

TABLE 1

|  | Twin-screw kneader 1 | Twin-screw kneader 2 |
| --- | --- | --- |
| Screw length (L) [mm] | 1590 | 2170 |
| Screw diameter (D) [mm] | 37 | 69 |
| L/D | 43 | 31.5 |
| Screw groove width (pitch) (W) [mm] | 37 | 69 |
| Screw groove depth (H) [mm] | 3.7 | 6.9 |

Twin-screw kneader 1: A trade name: "TEM-37SS", manufactured by Toshiba Machine Co., Ltd.
Twin-screw kneader 2: A trade name: "TEX 65αII", manufactured by The Japan Steel Works, Ltd.

Reference Example 1

For reference, molding was conducted by using a polycarbonate resin PC-1 not having been passed through a twin-screw kneader, and the YI and number of gels were measured. Results are shown in Table 2.

Examples 1 to 11, Comparative Examples 1 to 5, and Reference Example 2

A polycarbonate resin, a twin-screw kneader, and a screw shown in Table 2 were used, the polycarbonate resin was charged into the twin-screw kneader under a condition shown in Table 2, and kneading was conducted by properly setting a cylinder temperature of the twin-screw kneader to an appropriate value in conformity to fluidity of the resin, thereby producing a polycarbonate resin pellet. Molding was conducted by using the obtained polycarbonate resin pellet, and the YI and number of gels were measured. Results are shown in Table 2.

TABLE 2

|  |  | Reference Example 1 | Example 1 | Comparative Example 1 | Comparative Example 2 |
|---|---|---|---|---|---|
| Polycarbonate resin |  | PC-1 | PC-1 | PC-1 | PC-1 |
| Viscosity average molecular weight Mv |  | 17,000 | 17,000 | 17,000 | 17,000 |
| Twin-screw kneader No. |  | — | 1 | 1 | 1 |
| Screw type |  | — | A | A | A |
| Screw diameter D | [mm] | — | 37 | 37 | 37 |
| Resin supply amount Q | [kg/h] | — | 20 | 20 | 20 |
| Screw rotation number N | [rpm] | — | 100 | 200 | 160 |
| Q/N |  | — | 0.20 | 0.1 | 0.125 |
| Residence time tr | [sec] | — | 39.2 | 39.2 | 39.2 |
| Shear rate γ | [sec$^{-1}$] | — | 52.4 | 104.7 | 83.8 |
| Damage history |  | — | 2052 | 4103 | 3282 |
| Color tone (YI value) |  | 1.3 | 2.6 | 2.8 | 2.7 |
| Number of gels | [Gels/10 sheets] | 411 | 578 | 787 | 733 |

|  |  | Example 2 | Comparative Example 3 |
|---|---|---|---|
| Polycarbonate resin |  | PC-1 | PC-1 |
| Viscosity average molecular weight Mv |  | 17,000 | 17,000 |
| Twin-screw kneader No. |  | 1 | 1 |
| Screw type |  | A | A |
| Screw diameter D | [mm] | 37 | 37 |
| Resin supply amount Q | [kg/h] | 30 | 30 |
| Screw rotation number N | [rpm] | 160 | 200 |
| Q/N |  | 0.188 | 0.15 |
| Residence time tr | [sec] | 26.1 | 26.1 |
| Shear rate γ | [sec$^{-1}$] | 83.8 | 104.7 |
| Damage history |  | 2188 | 2735 |
| Color tone (YI value) |  | 2.7 | 2.9 |
| Number of gels | [Gels/10 sheets] | 957 | 1155 |

|  |  | Example 3 | Example 4 | Comparative Example 4 |
|---|---|---|---|---|
| Polycarbonate resin |  | PC-1 | PC-1 | PC-1 |
| Viscosity average molecular weight Mv |  | 17,000 | 17,000 | 17,000 |
| Twin-screw kneader No. |  | 1 | 1 | 1 |
| Screw type |  | A | A | A |
| Screw diameter D | [mm] | 37 | 37 | 37 |
| Resin supply amount Q | [kg/h] | 50 | 50 | 50 |
| Screw rotation number N | [rpm] | 300 | 200 | 400 |
| Q/N |  | 0.167 | 0.25 | 0.125 |
| Residence time tr | [sec] | 15.7 | 15.7 | 15.7 |
| Shear rate γ | [sec$^{-1}$] | 157.1 | 104.7 | 209.4 |
| Damage history |  | 2462 | 1641 | 3282 |
| Color tone (YI value) |  | 2.7 | 2.3 | 3 |
| Number of gels | [Gels/10 sheets] | 445 | 397 | 786 |

|  |  | Example 5 | Example 6 | Comparative Example 5 |
|---|---|---|---|---|
| Polycarbonate resin |  | PC-1 | PC-1 | PC-1 |
| Viscosity average molecular weight Mv |  | 17,000 | 17,000 | 17,000 |
| Twin-screw kneader No. |  | 1 | 1 | 1 |
| Screw type |  | B | B | B |
| Screw diameter D | [mm] | 37 | 37 | 37 |
| Resin supply amount Q | [kg/h] | 50 | 50 | 50 |
| Screw rotation number N | [rpm] | 300 | 200 | 400 |
| Q/N |  | 0.167 | 0.25 | 0.125 |
| Residence time tr | [sec] | 15.7 | 15.7 | 15.7 |
| Shear rate γ | [sec$^{-1}$] | 157.1 | 104.7 | 209.4 |
| Damage history |  | 2462 | 1641 | 3282 |

TABLE 2-continued

| | | | | | |
|---|---|---|---|---|---|
| Color tone (YI value) | | 2.5 | 2.1 | 2.8 | |
| Number of gels | [Gels/10 sheets] | 460 | 386 | 769 | |

| | | Example 7 | Example 8 | Example 9 | Example 10 | Example 11 | Reference Example 2 |
|---|---|---|---|---|---|---|---|
| Polycarbonate resin | | PC-2 | PC-2 | PC-2 | PC-3 | PC-4 | PC-2 |
| Viscosity average molecular weight Mv | | 15,000 | 15,000 | 15,000 | 11,500 | 22,500 | 15,000 |
| Twin-screw kneader No. | | 2 | 2 | 2 | 2 | 2 | 2 |
| Screw type | | A | A | A | A | A | A |
| Screw diameter D | [mm] | 69 | 69 | 69 | 69 | 69 | 69 |
| Resin supply amount Q | [kg/h] | 600 | 800 | 800 | 1000 | 1000 | 800 |
| Screw rotation number N | [rpm] | 375 | 500 | 420 | 526 | 526 | 364 |
| Q/N | | 1.60 | 1.60 | 1.90 | 1.90 | 1.90 | 2.2 |
| Residence time tr | [sec] | 6.2 | 4.6 | 4.6 | 3.7 | 3.7 | 4.6 |
| Shear rate γ | [sec$^{-1}$] | 196.3 | 261.8 | 219.9 | 275.4 | 275.4 | 190.6 |
| Damage history | | 1217 | 1217 | 1022 | 1024 | 1024 | 886 |
| Color tone (YI value) | | 1.2 | 1.18 | 1.17 | 1.12 | 1.18 | 1.25 |
| Number of gels | [Gels/10 sheets] | 31 | 24 | 9 | 8 | 8 | 13 |

When Example 1 and Comparative Examples 1 and 2 in which the twin-screw kneader 1 and the screw of Type A were used, the resin supply amount was set to 20 kg/h, and the screw rotation number N was changed were compared, in comparison with Comparative Examples 1 and 2 in which the damage history was more than 2,500, in Example 1, a pellet in which the generation of gels was suppressed and which was less yellowish could be produced.

Similarly, when Example 2 and Comparative Example 3 in which the resin supply amount was set to 30 kg/h, and the screw rotation number N was changed were compared, in comparison with Comparative Example 3 in which the damage history was more than 2,500, in Example 2, a pellet in which the generation of gels was suppressed and which was less yellowish could be produced.

Similarly, when Examples 3 and 4 and Comparative Example 4 in which the resin supply amount was set to 50 kg/h, and the screw rotation number N was changed were compared, in comparison with Comparative Example 4 in which the damage history was more than 2,500, in Examples 3 and 4, a pellet in which the generation of gels was suppressed and which was less yellowish could be produced.

When Examples 5 and 6 and Comparative Example 5 in which the twin-screw kneader 1 and the screw of Type B were used, the resin supply amount was set to 50 kg/h, and the screw rotation number N was changed were compared, in comparison with Comparative Example 5 in which the damage history was more than 2,500, in Examples 5 and 6, a pellet in which the generation of gels was suppressed and which was less yellowish could be produced.

In all of Examples 7 to 11 in which the twin-screw kneader 2 and the screw of Type A were used, the kind of the polycarbonate, the resin supply amount, and the screw rotation number N were changed under a condition under which the damage history was 500 to 2,500, a pellet in which the generation of gels was suppressed and which was less yellowish could be produced. From this result, it turns out that even if a large sized apparatus is used, good results are obtained, and application to the molecular weight over a wide range is possible. It should be noted that in Examples 1 to 6 using a small sized apparatus, since the pellet is used as the starting raw material and already undergoes thermal history, the amount of gels is relatively high; whereas in Examples 7 to 11 using a large sized apparatus, since the powdered material is used as the starting raw material and is small in terms of the number of undergoing thermal history in comparison with the above-described pellet, not only the amount of gels is low, but also the YI value is low.

It should be noted that in Reference Example 2, a pellet which is small in the damage history, is suppressed in the generation of gels, and is less yellowish can be produced; however, since the Q/N value is large, a load applied to the molding machine is large, so that when the machine is operated over a long period of time, there is a possibility of resulting in breakage.

From the results of Table 2, it turns out that according to the present invention, by controlling the damage history, it is possible to stably produce a transparent thermoplastic resin pellet which not only contain few gels but also is less yellowish without being influenced by the molecular weight of the resin and the size of the kneader and screw.

INDUSTRIAL APPLICABILITY

The transparent thermoplastic resin pellet obtained by the method of the present invention not only contain few gels but also is less yellowish and can be suitably used in the optical field of light guide plates, films, sheets, and the like of mobile phones and liquid crystal televisions.

The invention claimed is:

1. A method for producing a transparent thermoplastic resin pellet, the method comprising
kneading a transparent thermoplastic resin with a kneader under a condition under which a damage history calculated according to the following formula is from 500 to 2,500 cm$^3$/g:

Damage history={Residence time $(tr)$}×{Shear rate $(\gamma)$}

Residence time $(tr)=(W \times H \times L)/Q$

Shear rate $(\gamma)=(\pi \times D \times N)/H$ wherein W represents a screw groove width (pitch) [cm]; H represents a screw groove depth [cm]; L represents a screw length [cm]; Q represents a resin supply amount [g/s]; D represents a screw diameter [cm]; and N represents a screw rotation number [rps].

2. The method of claim 1, wherein the transparent thermoplastic resin is an aromatic polycarbonate.

3. The method of claim 2, wherein the aromatic polycarbonate has a viscosity average molecular weight (Mv) of from 11,000 to 23,000.

4. The method of claim 1, wherein the kneader is a twin-screw kneader.

5. The method of claim 1, wherein the kneader is equipped with a melt filter for removal of extraneous foreign matter.

6. The method of claim 1 wherein the damage history is from 900 to 2,000 $cm^3/g$.

7. The method of claim 1 wherein the transparent thermoplastic resin is selected from the group consisting of a polyarylate resin, a polymethyl methacrylate resin, a polystyrene resin and a polycarbonate resin.

8. The method of claim 1 wherein the transparent thermoplastic resin is a polycarbonate prepared from bisphenol A.

* * * * *